(12) United States Patent
Yageta et al.

(10) Patent No.: US 7,100,560 B2
(45) Date of Patent: Sep. 5, 2006

(54) PARTITION PLATE FOR INTAKE PORT, INTAKE PORT MOLDING SAND CORE AND CYLINDER HEAD

(75) Inventors: Kenji Yageta, Tochigi-ken (JP); Shigeki Nakabayashi, Ise (JP)

(73) Assignees: Nissan Motor Co., Ltd., Yokohama (JP); Aichi Machine Industry Co., Ltd., Nagoya (JP)

( * ) Notice: Subject to any disclaimer, the term of this patent is extended or adjusted under 35 U.S.C. 154(b) by 69 days.

(21) Appl. No.: 10/968,004

(22) Filed: Oct. 20, 2004

(65) Prior Publication Data

US 2005/0081822 A1 Apr. 21, 2005

(30) Foreign Application Priority Data

Oct. 20, 2003 (JP) .............................. 2003-359933

(51) Int. Cl.
*F02F 1/00* (2006.01)
(52) U.S. Cl. ..................................... 123/193.5; 123/305
(58) Field of Classification Search ............ 123/193.5, 123/305, 306, 308
See application file for complete search history.

(56) References Cited

U.S. PATENT DOCUMENTS

| 5,186,126 A * | 2/1993 | Tarekado et al. ...... 123/184.44 |
| 5,417,190 A * | 5/1995 | Ando et al. ................. 123/308 |
| 2002/0078921 A1 | 6/2002 | Kim et al. |

FOREIGN PATENT DOCUMENTS

| DE | 198 03 867 A1 | 8/1999 |
| EP | 1 336 750 A2 | 8/2003 |
| EP | 1 431 561 A1 | 6/2004 |
| JP | 2001-193469 A | 7/2001 |

\* cited by examiner

*Primary Examiner*—John T. Kwon
(74) *Attorney, Agent, or Firm*—Foley & Lardner LLP

(57) ABSTRACT

A partition plate (tumble plate) for an intake port is previously placed in an intake port molding sand core (port core) for forming an intake port of a cylinder head, and cast-in as the cylinder head is cast-molded, to partition the intake port into a plurality of ports. The partition plate is provided with shift preventing portion that prevent positional shift relative to the intake port molding sand core.

9 Claims, 7 Drawing Sheets

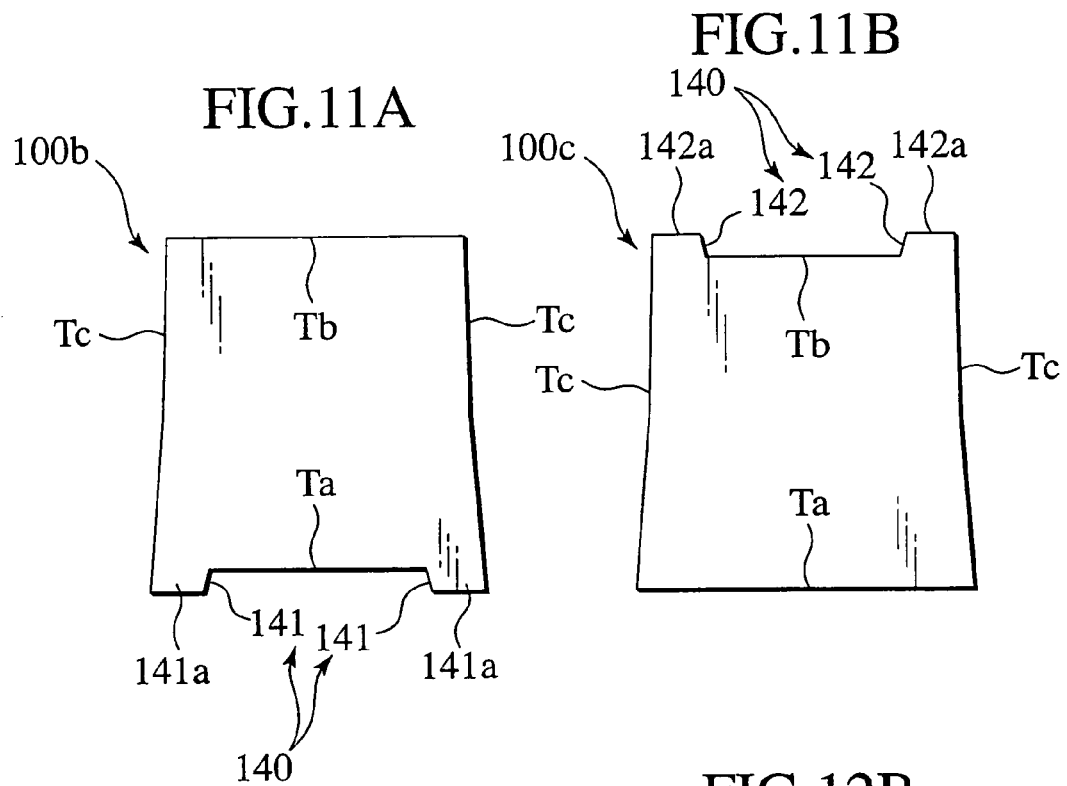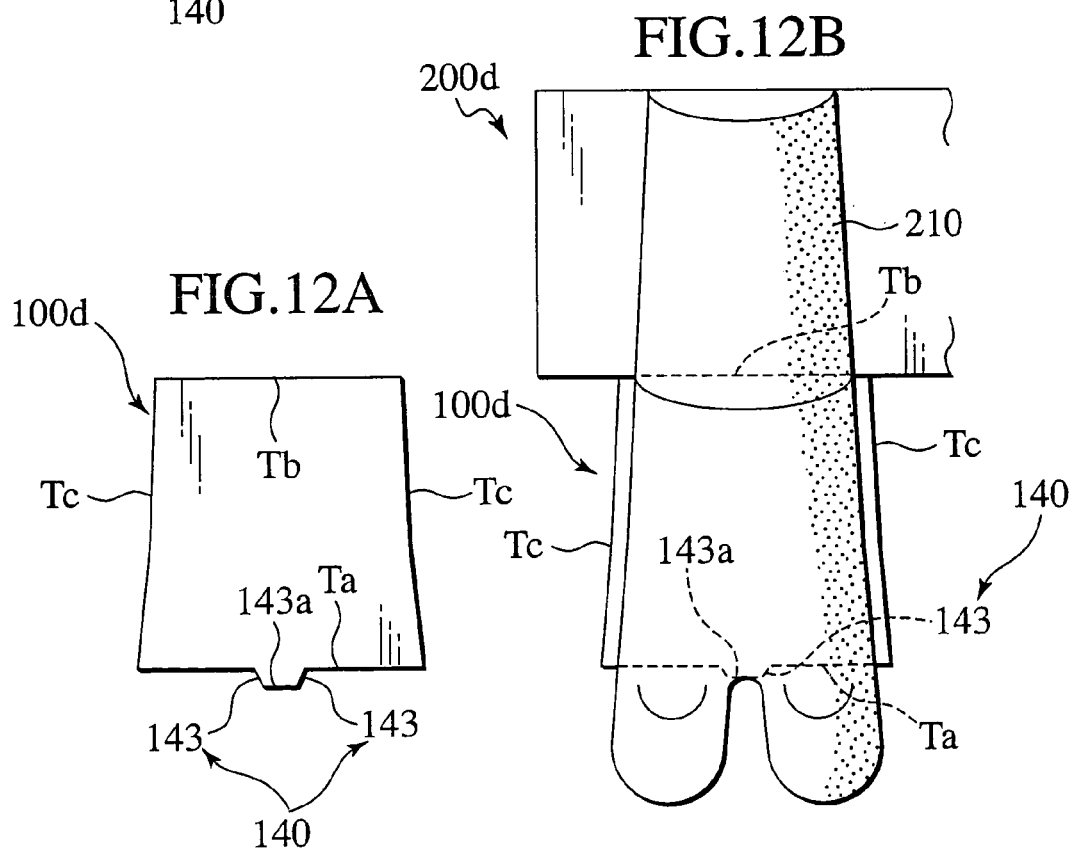

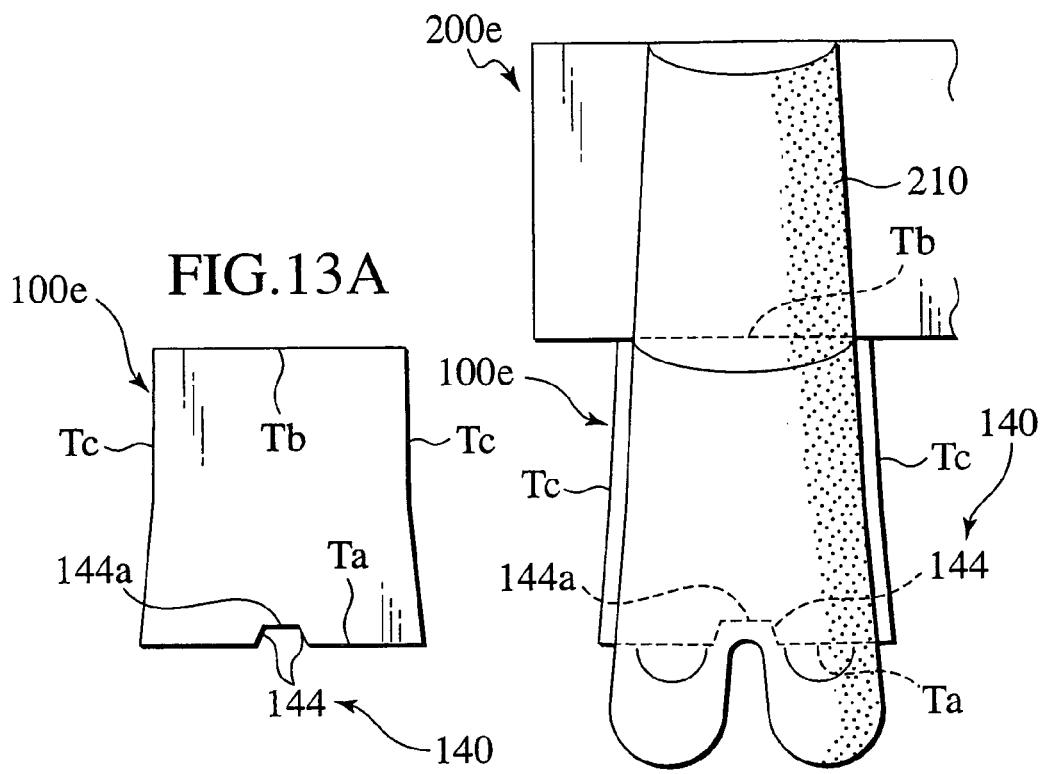
FIG. 13A
FIG. 13B
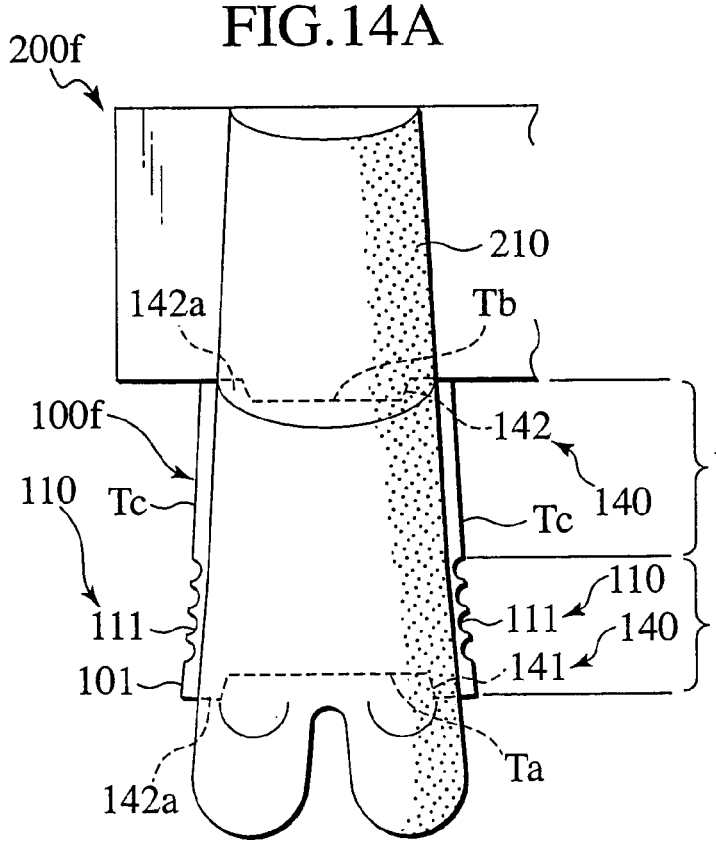
FIG. 14A
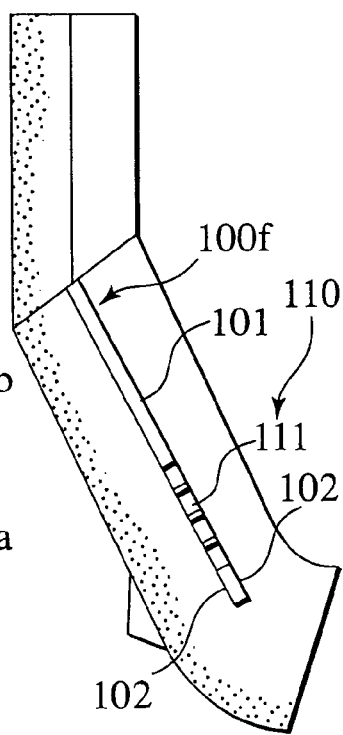
FIG. 14B

PARTITION PLATE FOR INTAKE PORT, INTAKE PORT MOLDING SAND CORE AND CYLINDER HEAD

BACKGROUND OF THE INVENTION

The present invention relates to a partition plate for an intake port, an intake port molding sand core and a cylinder head.

A cylinder of an internal combustion engine of recent years includes a cylinder having a partition plate, which is also called a tumbling plate. By controlling a flow control valve arranged in an intake side end portion of the intake port, intake air introduced into a cylinder bore from the intake port is made to flow in an eccentric manner by the partition plate, thereby enhancing a tumble flow (vertical swirl) generated in the cylinder bore, so that a fuel consumption is improved.

It is noted that in the partition plate, the side into which the intake air such as air and fuel gas flows, is referred to as "intake side", and the opposite side, that is, the cylinder bore side is referred to as "cylinder side" in this specification.

SUMMARY OF THE INVENTION

At the time of cast-molding of the cylinder head, a partition plate is generally molded by a cast-in method by placing a metal-made partition plate in an intake port molding sand core.

However, in the above-described method, the partition plate is held to the intake port molding sand core by a weak interactive force. Therefore, while the core is handled, an unintentional force is applied, and a positional shift or drift relative to the core is possibly caused by the unintentional external force. The generation of the positional shift of the partition plate relative to the core, further involves the positional shift of the partition plate relative to the intake port at the time of cast-molding of the cylinder head, thereby posing a problem that the partition plate can not exhibit desired function.

The present invention is provided in view of the above-described circumstances. According to the present invention, quality of a cast product is improved by preventing the positional shift of the partition plate relative to the intake port molding sand core, thereby largely improving the positional shift of the partition plate relative to the intake port.

According to a technical aspect of the present invention, a partition plate of an intake port for partitioning the intake port of the cylinder head into a plurality of parts, that is, the partition plate previously placed in the intake port molding sand core for forming the intake port of the cylinder head and cast-in as the cylinder head is cast-molded, is provided with a shift preventing portion for preventing the positional shift relative to the intake port molding sand core.

According to a second technical aspect of the present invention, a cylinder head comprises an intake port; and a partition plate of the intake port for partitioning the intake port into a plurality of ports in which the partition plate is provided with a shift preventing portion for preventing positional shift relative to an intake port molding core and is previously placed in the core, and cast-in as the cylinder head is cast-molded.

According to a third technical aspect of the present invention, a cast-molding method of a cylinder head having the partition plate in the intake port comprises steps of (i) placing the partition plate in the intake port molding sand core for forming the intake port of the cylinder head; (ii) the partition plate having a shift preventing portion for preventing the positional shift relative to the intake port molding sand core; and (iii) cast-in both side edge parts of the shift preventing portion so as to protrude outside.

BRIEF DESCRIPTION OF THE DRAWING

FIG. 11A and FIG. 11B are plan views illustrating the tumble plate in which a position to form step portions is modified.

FIG. 12A and FIG. 12B are plan views, illustrating the tumble plate of a second embodiment, and illustrating the port core in which the tumble plate is previously placed, respectively.

FIG. 13A and FIG. 13B are plan views illustrating the tumble plate of a third embodiment, and illustrating the port core in which the tumble plate is previously placed, respectively.

FIG. 14A and FIG. 14B are a plan view and a side view, illustrating the port core in which the tumble plate of a fourth embodiment is previously placed.

DESCRIPTION OF THE PREFERRED EMBODIMENTS

The preferred embodiments of the present invention will be explained with reference to the drawings hereafter.

First Embodiment

A cylinder head 10 having a partition plate 100 for an intake port 14 will be explained. It is noted that in the explanation given hereafter, the partition plate 100 for the intake port 14 is also referred to as "tumble plate" 100.

Figure 1:
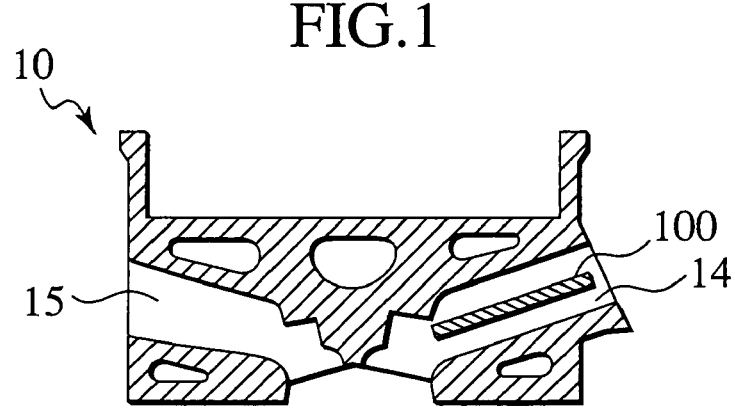
FIG. 1 is a schematic sectional view illustrating a cylinder head of an engine.
Figure 2:
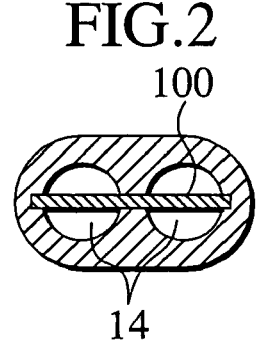
FIG. 2 is a cross sectional view of an intake port perpendicular to a primary axis thereof.
Figure 3:
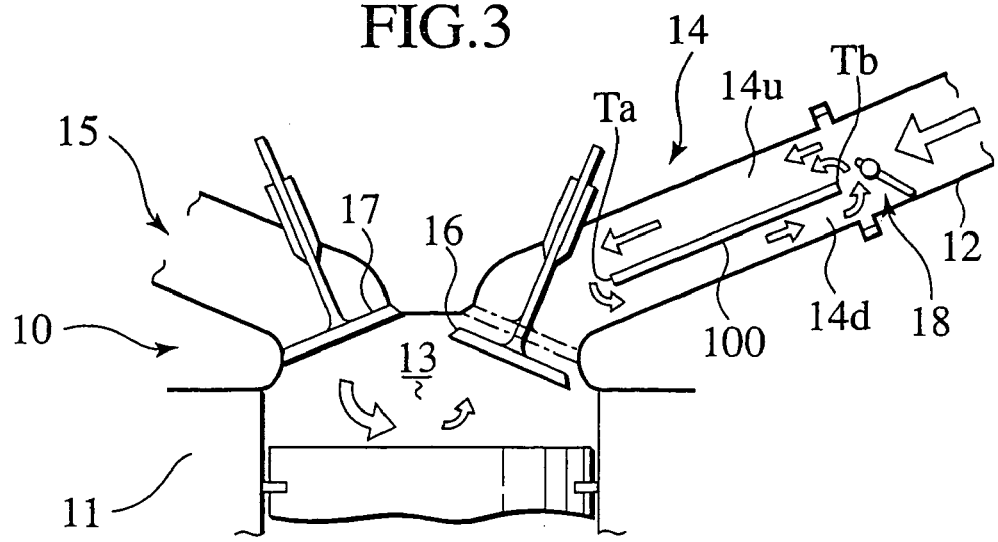
FIG. 3 is a schematic view illustrating an air current in the cylinder head.
Figure 4:
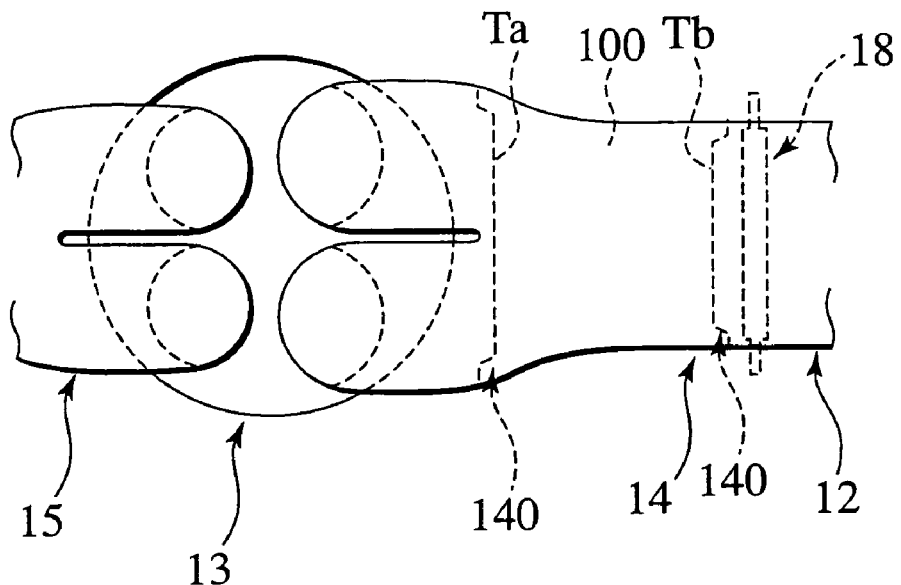
FIG. 4 is a schematic plan view of FIG. 3.

FIG. 1 is a schematic sectional view illustrating the cylinder head 10 of an engine, FIG. 2 is a cross sectional view of an intake port 14 perpendicular to the primary axis thereof, FIG. 3 is a schematic view illustrating an air current in the cylinder head 10, and FIG. 4 is a schematic plan view of FIG. 3.

When FIG. 1 and FIG. 3 are referred to, the cylinder head 10 is provided in an upper part of a cylinder block 11, and has an intake port 14 for introducing intake flow comprising air and fuel gas from an intake manifold 12 into a cylinder bore 13, and an exhaust port 15 for discharging exhaust gas produced after combusted in a cylinder bore 13. It is noted that the engine as shown in the figure has one cylinder and four valves, and is provided with two intake valves 16 and two exhaust valves 17, respectively.

In the intake port 14, the tumble plate 100 is provided along a flowing direction (white arrow) of an intake air from the intake side (outer periphery side of FIG. 3) toward the cylinder side. On the intake side of the tumble plate 100, as shown in FIG. 3 and FIG. 4, the intake manifold 12 having a control valve 18 is connected. The intake port 14 is partitioned by the tumble plate 100 into an upper port 14u and a lower port 14d, and the intake air is accelerated to flow in the upper port 14u as the lower port 14d is closed by a control valve 18, resulting in promoting the formation of a strong tumble (vertical swirl) in the cylinder bore 13.

In the intake port 14, a passage on the cylinder side is made to be in a greatly bent state, and therefore, if position of the cylinder side end portion Ta of the tumble plate 100 is fluctuated, characteristics of the air current is accordingly changed, thereby largely affecting a condition of generating the tumble. Therefore, the position of the cylinder side end portion Ta means an extremely important position.

Meanwhile, the position of the intake side end portion Tb of the tumble plate 100 is the side from which the intake air is branched and also the part where the control valve 18 is provided. Therefore, fluctuation of the position does not lead to the change in the characteristics of the air current, and generally, it is not necessary to more accurately set the position of the intake side end portion Tb, than the position of the cylinder side end portion Tb.

Accordingly, in order to improve the fuel consumption by developing a desired tumble flow in the cylinder bore 13, as described above, it is desired that the position of the cylinder side end portion Ta is arranged closer to a combustion chamber as long as restriction permits, that is, in a threshold position not interfering with a fuel injection range or a valve actuation range.

However, in a cast-in method generally used heretofore, as described above, the force by which the intake port molding sand core holds the tumble plate, is relatively weak, thereby making it easy for the position of the tumble plate to fluctuate relative to the core. As a result, at the time of cast-molding of the cylinder head, the positional shift or drift of the tumble plate relative to the intake port 14 is also easily caused. Therefore, it is difficult to position the cylinder side end portion Ta in the threshold position not interfering with the fuel injection range or the valve actuation range.

According to this embodiment, the positional shift or drift of the tumble plate relative to the intake port molding sand core is prevented during the cast-molding of the cylinder head 10, the position of the tumble plate relative to the intake port after cast-molding is regulated, and the cylinder side end portion Ta of the tumble plate 100 can thereby be positioned in the threshold position not interfering with a fuel injection range 21 or a valve actuation range 22 as shown in FIGS. 10A–10D.

Figure 5A:
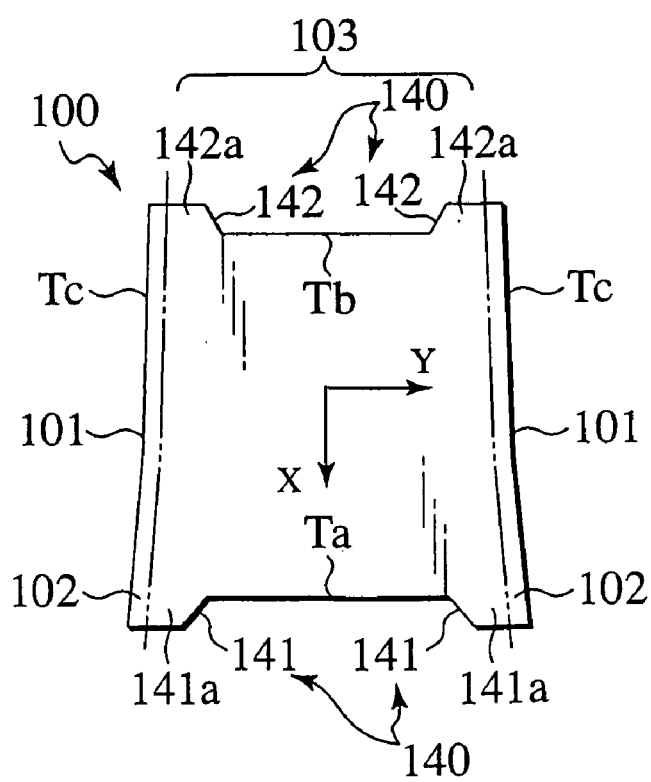
FIG. 5A and FIG. 5B are a plan view and a side view, illustrating a tumble plate according to a first embodiment.
Figure 5B:
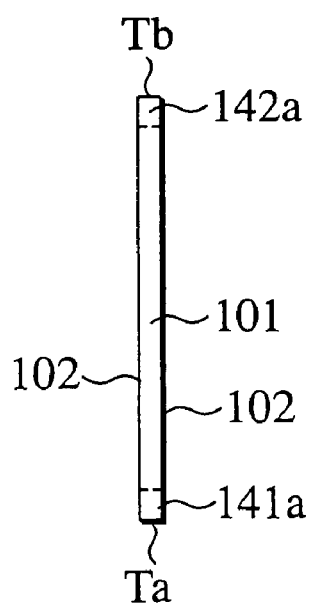

FIG. 5A and FIG. 5B are a plan view and a side view illustrating the tumble plate 100 of the first embodiment. It is noted that in FIG. 5A, the flowing direction of the intake air as being cast-enveloped by the cylinder head is shown by the x-axis, and the width direction of the tumble plate orthogonal to the x-axis is shown by the y-axis.

As shown in FIGS. 5A and 5B, the tumble plate 100 of this embodiment is previously placed in the intake port molding sand core 200 (see FIG. 6) for forming the intake port 14 of the cylinder head 10, as will be described later, and is cast-in as the cylinder head 10 is cast-molded. The tumble plate 100 functions to partition the intake port 14 of the cylinder head 10 into a plurality of ports (upper port 14u and lower port 14d). In the tumble plate 100, a shift preventing portion 140 for preventing the positional shift relative to the intake port molding sand core 200 are provided. It is noted that in the explanation hereafter, the intake port molding sand core 200 in which the tumble plate 100 is previously placed, is also referred to as "port core 200".

More specifically, the tumble plate 100 has a thin and substantially rectangular shape, and is provided with both side edge parts Tc to be cast in a molten metal as the cylinder head 10 is cast, an intake side end portion Tb being continuous to the both side edge parts Tc and to be arranged in an upper flow side of the intake air flow in the intake port 14, and a cylinder side end portion Ta being continuous to the both side edge parts Tc and to be arranged on a lower flow side of the flow of the intake air. The inner part of the both side edge parts Tc serves as a partition part 103 for partitioning the intake port 14. In the figure, designation marks 101 and 102 indicate side end faces 101 in the both side edge parts Tc and end faces 102 in a thickness direction, respectively.

Preferably, an aluminum alloy is used as a material of the tumble plate 100 in consideration of recycling.

Preferably, the thickness of the tumble plate 100 is decreased so as not to become resistant against the intake air circulating in the intake port 14. However, in a case where the material of the tumble plate 100 is the aluminum alloy, the thickness of the tumble plate is preferably set to be about 1.5 mm or more, in consideration of the necessity for preventing the thermal deformation of cast products of the cylinder head 10 during heat treatment.

The shift preventing portion 140 is formed in the cylinder side end portion Ta and the intake side end portion Tb being continuous to the both side edge parts Tc being cast in a molten metal, and has step portions 141 and 142 to be positioned in the sand core. The step portions 141 and 142 are arranged closer to the both side edge parts Tc of the cylinder side end portion Ta. In the figure, the step portion 141 of the cylinder side end portion Ta is positioned closer to the both side edge parts Tc, and provided with a pair of projection parts 141a protruding toward the lower flow side. Meanwhile, the step portion 142 of the intake side end portion Tb is positioned closer to the both side edge parts Tc, and provided with a pair of projection parts 142a protruding toward the upper flow side. The step portions 141 and 142 are extended along the flowing direction x of the intake air in the tumble plate 100, and are inclined relative to the x-axis. The lengths and the inclined angles of the step portions 141 and 142, serving as the shift preventing portion, relative to the flowing direction x of the intake air, can be modified due to a force required for the tumble plate 100 to be held in the port core 200 and an accuracy required for the tumble plate 100 to be positioned in the port core 200.

The projection parts 142a of the intake side end portion Tb of the tumble plate 100 may be chamfered. The reason is that in some cases, an end face of the cylinder head 10 to which the intake manifold 12 is connected, is machined by a cutter and the like in after-processing following the cast-molding of the cylinder head 10. In such a case, the intake side end portion Tb of the tumble plate 100 can be more smoothly cut, and return burrs generated in processing can be suppressed.

The manufacturing method of the tumble plate 100 is not particularly limited. However, the tumble plate 100 is preferably manufactured by a press molding, in view of that the same quality can be easily manufactured at a low cost.

Figure 6A:
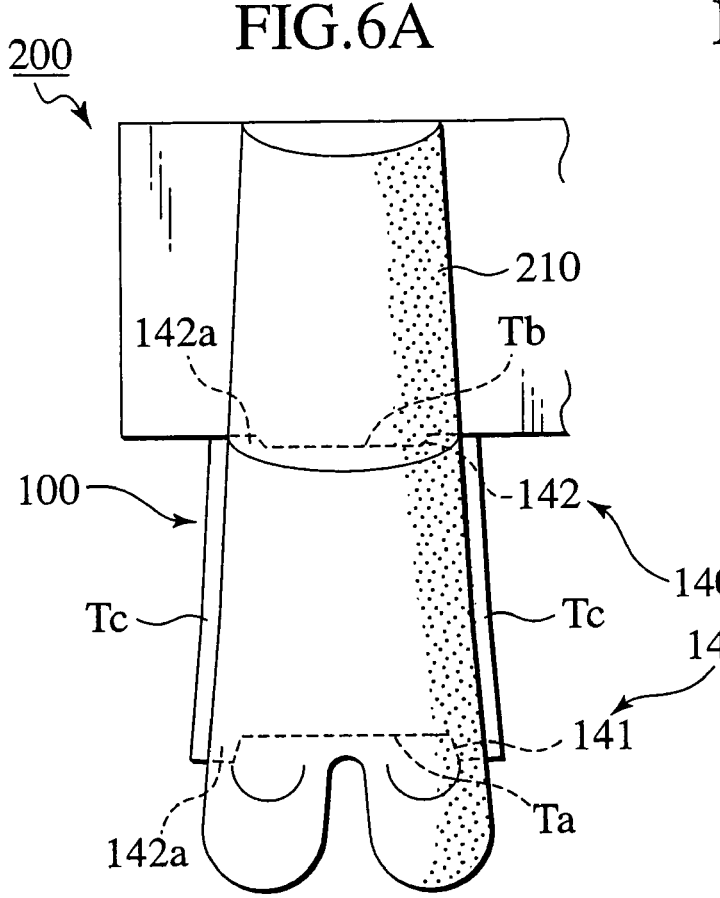
FIG. 6A and FIG. 6B are a plan view and a side view, illustrating a port core in which a tumble plate of the first embodiment is previously placed.
Figure 6B:
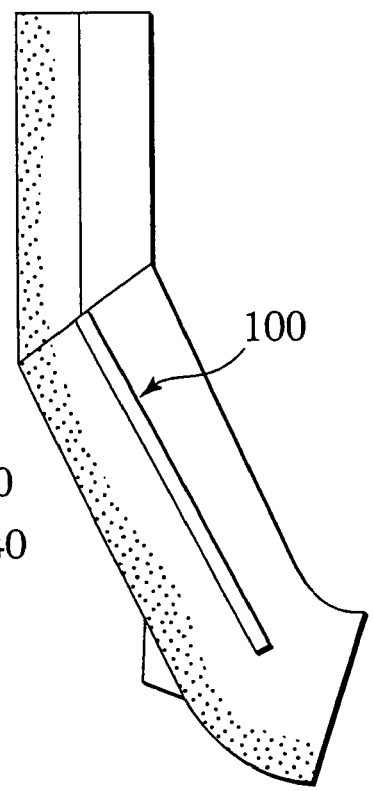
Figure 7:
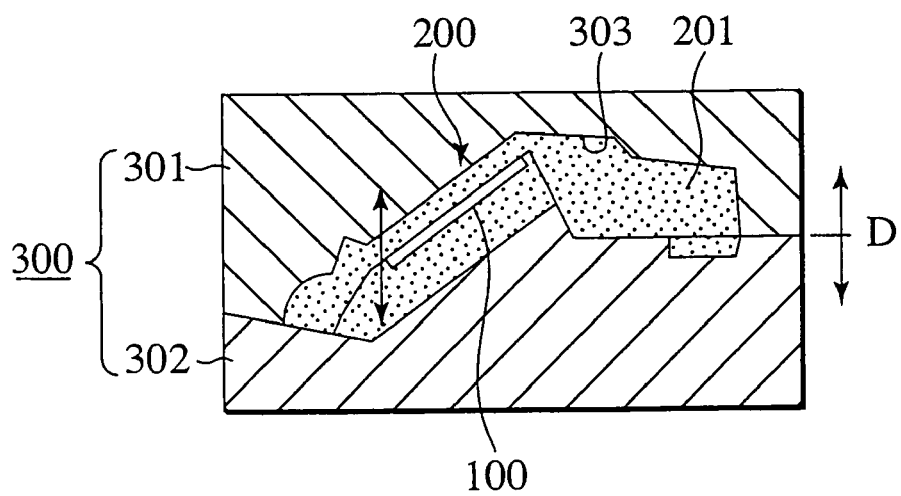
FIG. 7 is a schematic sectional view illustrating a mold for molding the port core.
Figure 8:
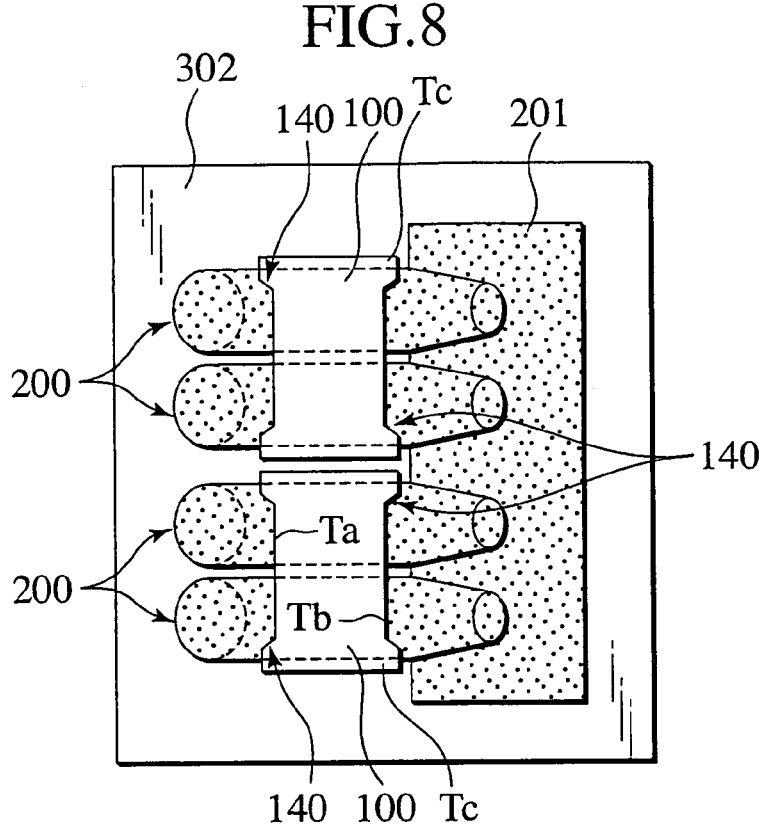
FIG. 8 is a plan view illustrating a state of the tumble plate exposed by breaking the mold for molding the port core.

FIG. 6A and FIG. 6B are a plan view and a side view illustrating the port core 200 in which the tumble plate 100 of the first embodiment is previously placed. In addition, FIG. 7 is a schematic sectional view illustrating a mold 300 used for molding of the port core 200, and FIG. 8 is a plan view illustrating the tumble plate 100 exposed by breaking the mold 300 for molding the port core 200. It is noted that the mold 300 for molding the port core 200 is also referred as "core mold 300" hereafter.

At the time of cast-molding of the cylinder head 10, molding of the port core 200 as shown in FIG. 6 is firstly performed by using the core mold 300 as shown in FIG. 7.

Figure 9:
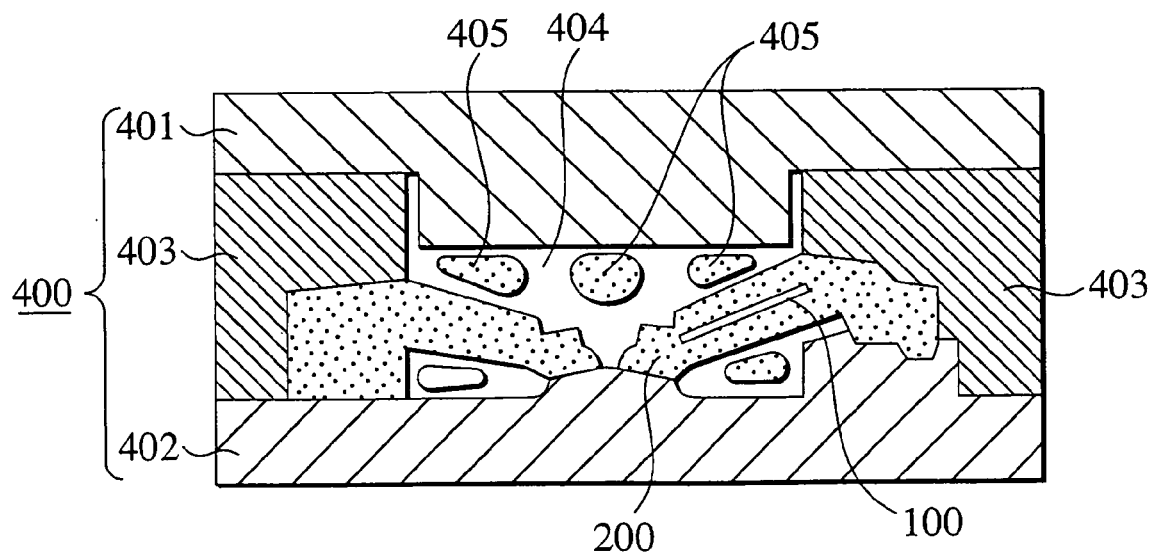
FIG. 9 is a sectional view illustrating a state of placing a port core in a casting mold for cast-molding the cylinder head.

The port core 200 is placed in a casting mold 400 for cast-molding of the cylinder head 10 as shown in FIG. 9, and the intake port 14 of the cylinder head 10 is thereby formed.

The port core 200 is previously placed so that the above-described tumble plate 100 protrudes outside, with both side edge parts Tc being cast in a molten metal and with step portions 141 and 142 positioned in the core sand 210.

The both side edge parts Tc of the tumble plate 100 protruding outside is a part to ensure the holding of the tumble plate 100 as being cast in the molten metal. A cast-in margin is, for example, set to be about 2 mm.

The core mold 300 comprises a plurality of partial molds constituted of a core upper mold 301 and a core lower mold 302. As the aforementioned partial molds are abutted to each other, a cavity 303 for forming the port core 200 is formed in the inside. In the cavity 303, the core sand is blown and compacted to form the port core 200.

As shown in FIG. 8, the core sand is blown in, in a state of previously placing the tumble plate 100 in the core mold 300, to mold the port core 200. The tumble plate 100 is positioned so as not to be shifted in the core mold 300, and placed in a seat formed on the mold mating surface of the core mold 300. Specifically, the tumble plate 100 is held in a state of being placed on the peripheral edge of the cavity of the core lower mold 302.

The port core 200 molded in the core mold 300 is taken out from the core mold 300, by dividing the partial molds such as the core upper mold 301 and the core lower mold 302 in a dividing direction (D direction) shown by an arrow in FIG. 7. Note that designation mark 201 in FIG. 7 indicates a skirting board.

In the port core 200 thus molded, the step portions 141 and 142 of the tumble plate 100 are positioned and arranged in the core sand 210 that forms the port core 200. By arranging the step portions 141 and 142 in the above-described way, the bite length of the cylinder side end portion Ta into the core sand 210, and the bite length of the intake side end portion Tb into the core sand 210 become long. As the step portions 141 and 142 are extended in the x-axis direction, the bite length into the core sand 210 becomes longer. Therefore, in addition to an interactive force of the core sand 210 and the interactive force between the core sand and the tumble plate 100, it becomes possible to use transverse rupture strength of the port core 200 for the holding power for holding the tumble plate 100 to the port core 200. Thus, the holding power of the tumble plate 100 to the port core 200 is increased. Further, the step portions 141 and 142 serve as resistance walls against the core sand 210 in the y-axis direction.

Accordingly, comparing with a case where the cylinder side end portion Ta and the intake side end portion Tb are formed in linear shapes, the tumble plate 100 can sufficiently resist against the force along the x-axis direction and the force along the y-axis direction. And even if an unintentional force is applied while the port core 200 is handled, positional shift of the tumble plate 100 relative to the port core 200 can be prevented. In addition, since the positional shift of the tumble plate 100 relative to the port core 200 is not generated, it becomes possible to surely secure the cast-in margin protruding outside from the port core 200.

FIG. 9 is a sectional view illustrating a state where the port core 200 is placed in a casting mold 400 for cast-molding the cylinder head 10.

As shown in FIG. 9, the port core 200 is incorporated in the casting mold 400 for molding the cylinder head 10. The casting mold 400 comprises an upper mold 401, a lower mold 402, and a side mold 403. As the port core 200 is supported between the lower mold 402 and the side mold 403, and covered with the upper mold 401, a cavity 404 for molding the cylinder head 10 is formed inside. It is noted that the numeral "405" as depicted in the figure represents a core for molding a water jacket. A low pressure die casting (LPDC) method is adopted as a casting method, for example.

In this state, as the molten metal comprising an aluminum alloy or the other metal is poured from a sprue (not shown) into the cavity 404, the tumble plate 100 is cast-in at the both side edge parts Tc. Then, as the molten metal is solidified, the entire part of the both side edge parts Tc is fixed to form the cylinder head 10 as shown in FIG. 1.

In this embodiment, the shift preventing portion 140 having the step portions 141 and 142 supposed to be positioned in the core sand 210 are provided in the cylinder side end portion Ta and the intake side end portion Tb of the tumble plate 100. Since the positional shift of the tumble plate 100 relative to the port core 200 is prevented by the shift preventing portion 140, in a case where the port core 200 is incorporated in the casting mold 400, the tumble plate 100 can be arranged in a regular position in design in the casting mold 400. Whereby, when the both side edge parts Tc of the tumble plate 100 is cast in the molten metal, it becomes possible that the position of the tumble plate 100 relative to the intake port 14 is regulated, and the tumble plate 100 is arranged at a desired position as designed in the cylinder head 10.

Figure 10A:
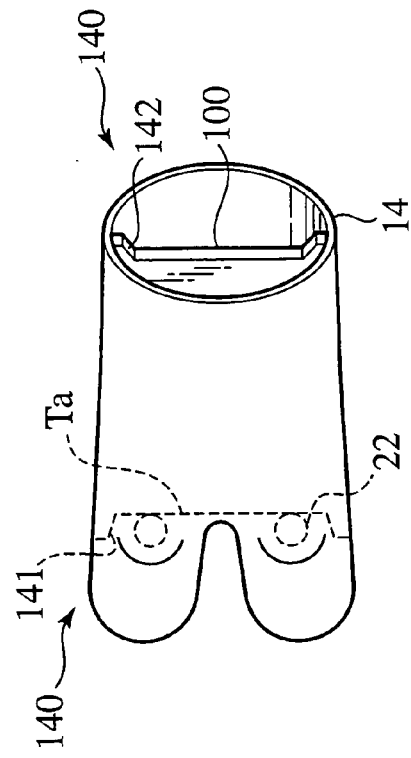
FIG. 10A and FIG. 10B are a schematic plan view and a schematic sectional view illustrating the intake port in the cylinder head in which a fuel injection device of multi-point injection type (MPI) is incorporated.
Figure 10B:
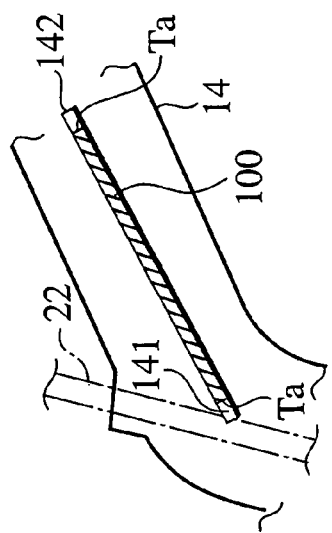
Figure 10C:
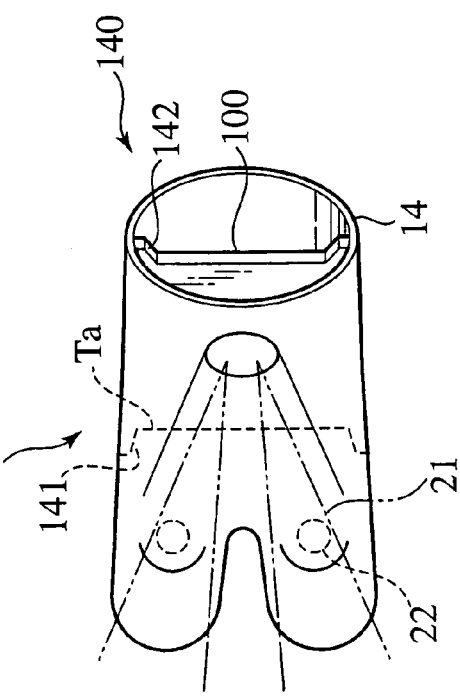
FIG. 10C and FIG. 10D are a schematic plan view and a schematic sectional view illustrating the intake port in the cylinder head in which the fuel injection device of single-point injection (SPI) type is incorporated.
Figure 10D:
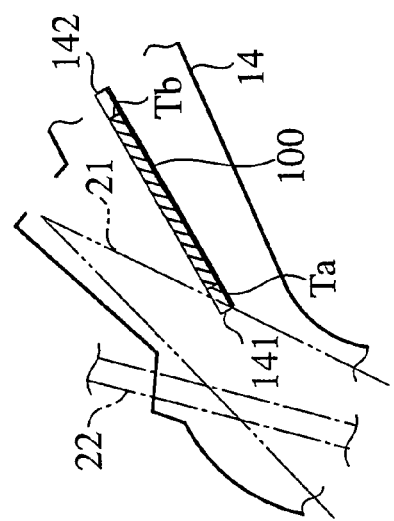

FIG. 10A and FIG. 10B are a schematic plan view and a schematic sectional view illustrating the intake port 14 in the cylinder head 10 in which a multi point injection type fuel injection device is incorporated, and FIG. 10C and FIG. 10D are a schematic plan view and a schematic sectional view illustrating the intake port 14 in the cylinder head 10 in which a single point injection type (SPI) fuel injection device is incorporated.

In this embodiment, since the position of the tumble plate 100 relative to the intake port 14 can be regulated, the cylinder side end portion Ta of the tumble plate 100 can be positioned in the threshold position not interfering with the fuel injection range or the valve actuation range.

Specifically, as shown in FIG. 10A and FIG. 10B, in the cylinder head 10 in which the MPI type fuel injection device is incorporated, the cylinder side end portion Ta can be positioned in the threshold position not interfering with the fuel injection range. In addition, as shown in FIG. 10C and FIG. 10D, in the cylinder head 10 in which the SPI type fuel injection device is incorporated, the cylinder side end portion Ta can be positioned in the threshold position not interfering with the valve actuation range 22. In either case, the step portions 141 and 142 of the tumble plate 100 do not interfere with the fuel injection range 21 or the valve actuation range 22. By positioning the cylinder side end portion Ta in the threshold position not interfering with the fuel injection range 21 or the valve actuation range 22, a desired tumble flow can be surely developed in the cylinder bore 13, and therefore the fuel consumption or the like can be surely improved.

As described above, according to this embodiment, by preventing the positional shift/drift of the tumble plate 100 relative to the port core 200, the positional shift of the tumble plate 100 relative to the intake port 14 can be greatly improved. Since the cast-enveloped margin of both ends can be kept constant, it does not follow that either of the cast-in margins becomes small, thereby insufficiently partitioning the port. Therefore, the tumble plate 100 can surely partition the intake port 14. Since the position of the tumble plate 100 is stabilized, the tumble flow as a drift of air is stabilized, and the fuel consumption is also stabilized, and the quality of the cylinder head 10 can thereby be improved. Further, the cylinder side end portion Ta of the tumble plate 100 can be positioned in the threshold position not interfering with the fuel injection range 21 or the valve actuation range 22, a desired tumble flow can be developed in the cylinder bore 13, and the fuel consumption can be further improved.

Incidentally, the cast-in portion of the tumble plate is not welded to a product, and therefore, the cast-in portion has a shape of a notch in a product form. When the position of the tumble plate 100 is shifted relative to the intake port 14, the shape of the notch becomes large on the side where the cast-in margin becomes large, thereby posing the problem that stress concentration occurs, to invite decrease of strength. In this embodiment, since the cast-in margin of both ends can be kept constant, the above-described decrease of strength is not invited.

FIG. 11A and FIG. 11B are plan views illustrating the tumble plates 100b and 100c in which a position to form the step portions are altered.

The present invention is not limited to a case where the step portions 141 and 142 serving as a shift preventing portion 140 is provided in both of the cylinder side end portion Ta and the intake side end portion Tb of the tumble plate 100. The shift preventing portion 140 may be provided in either of the cylinder side end portion Ta or the intake side end portion Tb, provided that the positional shift of the tumble plate 100 relative to the port core 200 can be prevented. For example, as shown in FIG. 11A, the step portions 141 serving as the shift preventing portion 140 may be arranged in only the cylinder side end portion Ta, or as shown in FIG. 11B, the step portions 142 serving as the shift preventing portion 140 may be arranged only in the intake side end portion Tb. The above described either case may be adopted.

In the above described either case, by preventing the positional shift of the tumble plates 100b and 100c relative to the port core 200, the positional shift of the tumble plates 100b and 100c relative to the intake port 14 can be greatly improved, and therefore the quality of the product can be improved. Further, the cylinder side end portion Ta of the tumble plates 100b and 100c can be positioned in the threshold position not interfering with the fuel injection range 21 or the valve actuation range 22, a desired tumble flow can be developed in the cylinder bore 13, and the fuel consumption can be further improved.

Second Embodiment

FIG. 12A and FIG. 12B are a plan view illustrating a tumble plate 100d according to a second embodiment, and a plan view illustrating a port core 200d in which the tumble plate 100d is previously placed. The tumble plates 100d and 100e of the second embodiment are different from those of the first embodiment in that the step portions 143 and 144 serving as a shift preventing portion 140 are positioned in the center portion of the cylinder side end portion Ta.

The step portions serving as the shift preventing portion are not limited to a case where they are arranged closer to the both side edge parts Tc of the cylinder side end portion Ta and/or the intake side end portion Tb, but may be arranged in substantially the center of the cylinder side end portion Ta and/or the intake side end portion Tb.

In this embodiment, as shown in FIGS. 12A and 12B, the step portions 143 are positioned in the center portion of the cylinder side end portion Ta, and provided with one projection portion 143a protruding toward the lower flow side.

Third Embodiment

FIG. 13A and FIG. 13B are a plan view illustrating a tumble plate 100e according to a third embodiment, and a plan view illustrating a port core 200e in which the tumble plate 100e is previously placed.

The tumble plates 100d and 100e of the third embodiment are different from those of the first embodiment in that the step portions 143 and 144 as the shift preventing portion 140 are positioned in the center portion of the cylinder side end portion Ta.

In addition, in the third embodiment, as shown in FIG. 13A and FIG. 13B, the step portion 144 is formed by having one recess portion 144a positioned in the center portion of the cylinder side end portion Ta so as to be recessed toward the upper flow side.

In either case of the second embodiment or the third embodiment, the step portions 143 and 144 of the tumble plates 100d and 100e are arranged by being positioned in the core sand 210 that forms port cores 200d and 200e. Even if the step portions 143 and 144 are arranged in this way, the positional shift of the tumble plates 100d and 10e relative to the port cores 200d and 200e can be prevented even if an unintentional force is applied while the port cores 200d and 200e are handled.

According to the second embodiment and the third embodiment, in the same way as the first embodiment, by preventing the positional shift of the tumble plates 100d and 100e relative to the port cores 200d and 200e, the positional shift of the tumble plates 100d and 100e relative to the intake port 14 can be greatly improved, and the quality of the products can thereby be improved. Further, the cylinder side end portion Ta of the tumble plates 100d and 10e can be positioned in the threshold position not interfering with the fuel injection range 21 or the valve actuation range 22, a desired tumble flow can be developed in the cylinder bore 13, and a fuel consumption can be further improved.

In addition, in the same way as described in an alteration example of the first embodiment, the step portions 143 and 144 serving as the shift preventing portion 140 may also be provided in the center portion of the intake side end portion Tb, as well as in the cylinder side end portion Ta, or in approximately the center of the intake side end portion Tb also.

Further, while the step portions are arranged in the parts closer to the both side edge parts Tc in the cylinder side end portion Ta, the step portions can also be arranged in the center portion of the intake side end portion Tb.

Fourth Embodiment

FIG. 14A and FIG. 14B are a plan view and a side view illustrating a port core 200f in which a tumble plate 100f of a fourth embodiment is previously placed.

The tumble plate 100f of this embodiment is different from that of the first embodiment in that in addition to the shift preventing portion 140 for preventing the positional shift of the tumble plate 100f relative to the port core 200f, promoting portion 110 is provided at side end faces 101 of the both side edge portions Tc to promote the solidification of the molten metal. The other structure is the same as that of the first embodiment.

As described above, the position of the cylinder side end portion Ta of the tumble plate 100f is an important position because it greatly affects the condition for the generation of the tumble flow.

In this embodiment, in a case of cast-molding the cylinder head 10, the cylinder side end portion Ta of the tumble plate 100f is fixed in position, and the intake side end portion Tb of the tumble plate 100f is positioned relatively freely. Therefore, on pouring of the molten metal, even if the tumble plate 100f is thermally affected, the intake side end portion Tb can absorb the thermal affection.

Each of the promoting portion 110 is formed at each part of the side end faces 101 in the both side edge parts Tc, and in this embodiment, the part is selected to be a part closer to the cylinder side end portion Ta. The promoting portions 110 comprise recess parts 111 formed on the side end faces 101 in the both side edge parts Tc. The recess parts 111 have semi-cylindrical shapes. Needles to say, the recess parts 111 serving as the promoting portions 110, are capable of changing the shape of a surface depression, the number, the placing position, and the placing density, in consideration of the positional accuracy required for the tumble plate 100f and the thermal expansion of the tumble plate 100f.

It is noted that for simplifying the explanation, in the parts of the both side edges Tc of the tumble plate 100f, the part provided with the promoting portion 110 is also called "solidification promoting portion a", and the other part not provided with the promoting portion 110 is called "smooth part b".

The promoting portion 110 functions to fix the position of the tumble plate 100f relative to the intake port 14, by promoting the solidification of the molten metal near the part (solidification promoting portion a) provided with the promoting portion 110 with respect to the solidification of the molten metal near the other part (smooth part b).

The port core 200f in which the tumble plate 100f provided with the aforementioned promoting portion 110 is incorporated in the casting mold 400, and as the molten metal is pored into the cavity 404, the tumble plate 100f is cast-in at both side edge portions Tc, and as the molten metal is solidified, the entire body of the both side edge portions Tc is fixed.

Here, the solidification promoting portion a being closer to the cylinder side end portion Ta in the both side edge portions Tc has a larger area in contact with the molten metal per unit length compared with the smooth part b due to the existence of the recess parts 111. Therefore, as the both side edge parts Tc of the tumble plate 100f are cast-in, the molten metal near the solidification promoting portion a is relatively rapidly cooled compared with the molten metal near the smooth part b, thereby promoting the solidification of the molten metal. Further, passage resistance is increased as the molten metal passes due to the existence of the recess parts 111, and therefore the molten metal near the solidification promoting portion a is relatively liable to stagnate compared with the molten metal near the smooth part b, thereby promoting the solidification of the molten metal.

The action to rapidly cool the molten metal by the promoting portions 110 is coupled with the action to stagnate the molten metal, and therefore the solidification of the molten metal near the solidification promoting portion a is further promoted than the solidification of a molten metal near the smooth part b. Thus, the both side edge portions Tc are fixed in advance of the smooth part b, and the position of the tumble plate 100f relative to the intake port 14 is regulated. Also, by the existence of the recess parts 111, a resistance of the molten metal in a near solidified state being caused against movement of the tumble plate 100f therein is also increased. From these viewpoints, it is difficult for the tumble plate 100f to move, and therefore the positional shift of the tumble plate 100f is prevented. In this embodiment, the part closer to the cylinder side end portion Ta is fixed in advance of the part closer to the intake side end portion Tb in the both side edge portions Tc. Therefore, the positional shift of the cylinder side end portion Ta relative to the intake port 14 can be prevented.

In addition, since the solidification of the molten metal near the solidification promoting portion a is promoted, even when a small quantity of sand or a resin film is remained in the both side edge parts Tc, airtightness is surely held to ensure the fixation of the tumble plate 100f. Thus, in the cylinder head 10 as a product after the completion of casting, generation of the play in the product of the tumble plate 100f can largely be reduced.

Further, the solidification promoting portion a of the both side edge parts Tc is fixed in advance, and the smooth part b is fixed relatively later than the solidification promoting portion a. Thus, the direction in which the tumble plate 100f is thermally expanded by heat of the molten metal can be limited or controlled in one direction from the solidification promoting portion a where the molten metal began to solidify to the smooth part b where the molten metal is remained in an un-solidified state. In this embodiment, in the tumble plate 100f, since the side of the cylinder side end portion Ta is fixed in advance, the direction in which the tumble plate 100f thermally expands can be limited to the direction toward the intake side end portion Tb. Since the thermal expansion of the tumble plate 100f is collected to the intake side end portion Tb which is easily expanded, the port core 200f is not pressurized by the cylinder side end portion Ta. Therefore, cracks or breakage is not generated in an important region of the port core 200f for molding the intake port 14.

Even if the thermal expansion of the tumble plate 100f is large, since the port core 200f is pressurized by the intake side end portion Tb, the cracks generated in the port core 200f can be led to the skirting board 201 side to be induced there. A burr caused by the cracks of the port core 200f is generated not in the cylinder head 10 as the product after the completion of the cast-molding, but in a part outside the product form. Accordingly, deburring operation required later can be simplified or eliminated.

As described above, according to the fourth embodiment, the positional shift of the tumble plate 100f relative to the port core 200f can be prevented by the shift preventing portion 140 provided in the tumble plate 100f, and further, even if the tumble plate 100f is thermally expanded, the tumble plate 100f is accurately cast in a state of holding the position of the cylinder side end portion Ta, which is an important position. Accordingly, the positional shift of the tumble plate 100f relative to the intake port 14 can be still further improved, the quality of the product can be improved by sufficiently suppressing the play in the product, further, a burr generation part caused by the cracks of the port core 200f is made to be limited, and the deburring operation required later can be simplified.

Incidentally, there are some cases where the positional accuracy of the intake side end portion Tb of the tumble plate needs to be increased, according to types of the structure of the intake port 14 and the fuel injection device. In this case, as the promoting portion 110 that promotes the solidification of the molten metal is provided in a part closer to the intake side end portion Tb, the positional accuracy if the intake side end portion Tb can be improved. Also, the promoting portions 110 can be provided on the end faces 102 in the thickness direction of the both side edge parts Tc. Further, the promoting portions 110 can adopt a suitable structure and form, provided that the solidification of the molten metal is promoted, and for example, it may be a projection part, a projection and recess part, and a through hole, and the like.

ADVANTAGES

According to the present invention, positional shift or drift of a partition plate for an intake port relative to an intake port molding sand core can be prevented by shift preventing portion, therefore, as a cylinder head is cast-molded, position of the partition plate relative to the intake port can be stably regulated therefore the positional shift of the partition plate can be greatly improved, and quality of a product can thereby be improved. In addition, a cast-in margin of the partition plate in a product can be kept constant, therefore the partition plate can surely partition the intake port, and a drift of intake air in the intake port can be stabilized.

This application claims benefit of priority under 35USC §119 to Japanese Patent Applications No. 2003-359933, filed on Oct. 20, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A partition plate of an intake port for partitioning an intake port of a cylinder head into a plurality of ports, comprising:
    a shift preventing portion for preventing positional shift relative to an intake port molding core, wherein
    the partition plate of the intake port is previously placed in the core and cast-in as the cylinder head is cast-molded.

2. The partition plate of the intake port according to claim 1, further comprising
    step portions being formed at least in either of a cylinder side end portion or an intake side end portion continuous to both side edge parts of the shift preventing portion, and being positioned in the core, wherein
    the both side edge parts are cast-in as the cylinder head is cast-molded.

3. The partition plate according to claim 2, wherein
    the step portions are arranged at parts closer to the both side edge parts of the cylinder side end portion or the intake side end portion.

4. The partition plate of the intake port according to claim 2,
    wherein the step portions are arranged in the center portion of the cylinder side end portion or the intake side end portion.

5. The partition plate of the intake port according to claim 2, wherein
    the core is placed in a casting mold for cast-molding a cylinder head to form an intake port thereof; and
    the core is placed in such a way that the partition plate protrudes outside so as to be cast in a molten metal at the both side edge parts, and the step portions positioned inside the core.

6. A cylinder head, comprising:
    an intake port; and
    a partition plate of the intake port for partitioning the intake port into a plurality of ports, provided with a shift preventing portion for preventing positional shift relative to an intake port molding core, wherein
    the partition plate is previously placed in the core, and cast-in as the cylinder head is cast-molded.

7. The cylinder head according to claim 6, wherein
    the partition plate of the intake port has step portions being formed in at least either of a cylinder side end portion or an intake side end portion continuous to both side edge parts of the shift preventing portion, and positioned in the core, and
    the both side edge parts are cast-in as the cylinder head is cast-molded.

8. The cylinder head according to claim 6, wherein
    the cylinder side end portion or the intake side end portion of the intake port is positioned at a threshold position so as not interfering with a fuel injection range or a valve actuation range.

9. A cylinder head, comprising:
    an intake port; and
    a partitioning means of the intake port for partitioning the intake port into a plurality of ports, provided with a shift preventing means for preventing positional shift relative to an intake port molding core, wherein
    the partition means is previously placed in the core, and cast-in as the cylinder head is cast-molded.

* * * * *